United States Patent Office 3,348,793
Patented Oct. 24, 1967

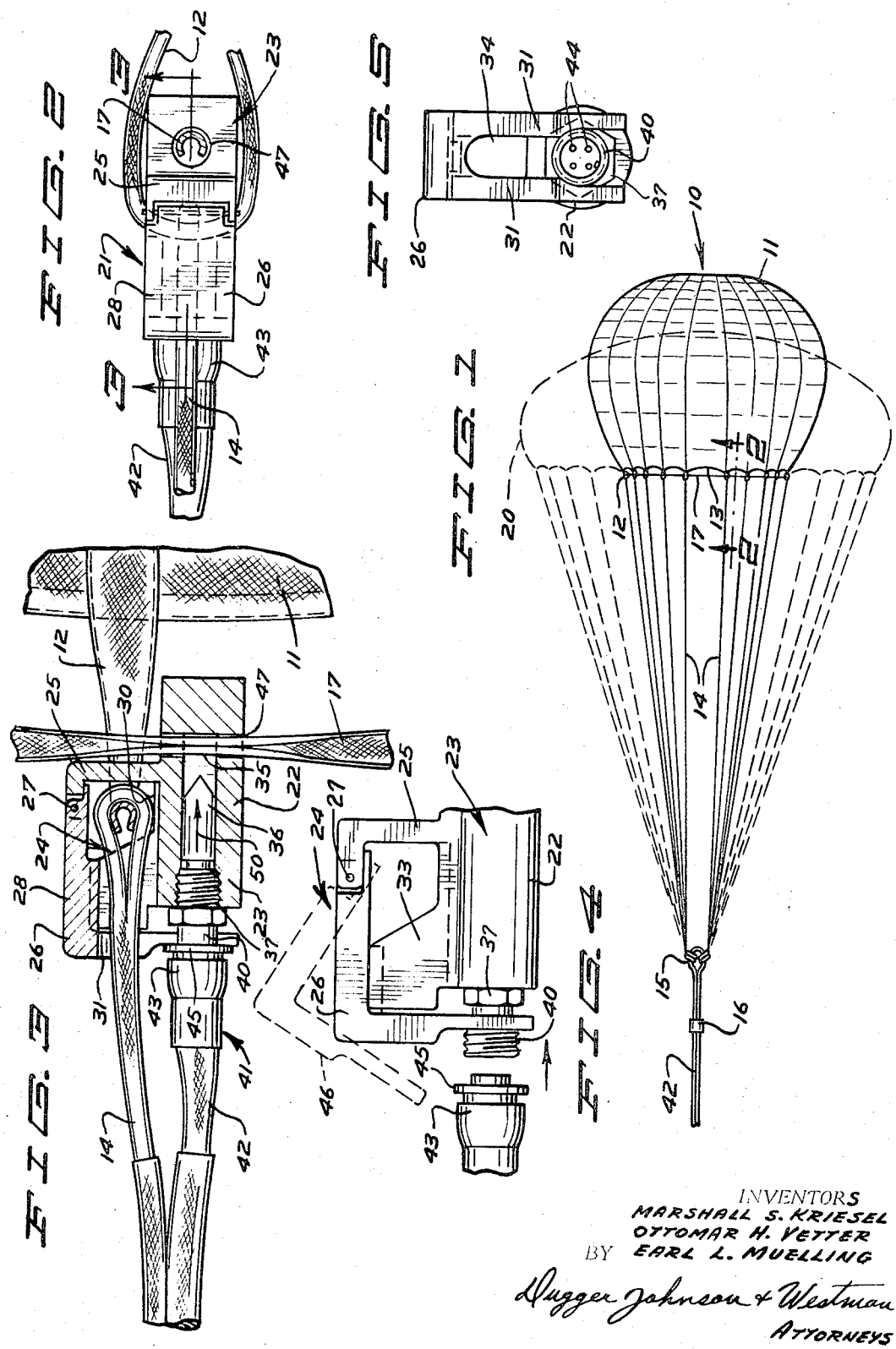

3,348,793
MEANS FOR ATTACHING REEFING LINE CUTTER TO LOAD CARRYING PARACHUTES
Marshall S. Kriesel, St. Paul, Ottomar H. Vetter, Minneapolis, and Earl L. Muelling, Green Isle, Minn., assignors to Aerospace Research Corporation, Minneapolis, Minn., a corporation of Minnesota
Filed Oct. 18, 1965, Ser. No. 496,887
10 Claims. (Cl. 244—152)

ABSTRACT OF THE DISCLOSURE

The present invention relates to a reefing line cutter for cutting the lines that are used for reef or partially closed parachutes and which are severed to permit the parachute to open to its full size. The cutter comprises a small guillotine type cutter through which the reefing line passes and which is explosively actuated. The cutter itself is attached to a loop in the canopy of the parachute through the use of a latch finger that passes into the loop and locks in place to mechanically hold the cutter fastened to a loop in the parachute and positioned to sever the reefing line upon detonation.

---

The present invention has relation to reefing line cutters for use in load extraction parachutes for loads delivered from airplanes, and more particularly to a cutter which has a unique structure for attaching it directly to one canopy loop and one of the suspension lines of the parachute used for the load extraction.

The present device presents a unique way of attaching a cutter that cuts the reefing line of a load parachute. A reefing line is a line which is passed through the canopy loops at the periphery of a parachute and which will hold the periphery of the parachute at a predetermined diameter to prevent the parachute from becoming fully expanded. Usually when a load is to be delivered to ground troops from an aircraft the parachute which will descend with the load is released from the aircraft some distance from the target and is held in a partially reefed condition until the exact point at which the load is to be dropped is reached. At that time, the reefing line, which has held the parachute partially closed, is cut with a reefing line cutter, the parachute expands to its full diameter, the drag on the load increases and break away couplers will release the load. The load will thus be pulled out of the aircraft by the parachute, and then will be dropped to the ground by the parachute.

The reefing line cutters are attached to these parachutes, and, of course, to be operative must cut the reefing lines quickly and positively. In addition, they should be easy to attach and must not become entangled with the parachute. Most of the reefing line cutters utilize an electrical signal which will detonate an explosive and project a guillotine type cutter against the reefing line, thereby severing it and permitting it to drop away and thus releasing the parachute to its fully expanded condition. The electrical signals are carried to the cutters by suitable electrical conductors which also must be designed so as not to become entangled with the parachute suspension line. The reefing line cutter also aids in maintaining the electrical cable in an untangled condition, thereby insuring satisfactory operation at all times.

As disclosed, the device of the present invention includes a reefing line cutter assembly which has provisions for receiving the reefing line that is to be cut, and which has a hinged latch door or finger that will open to permit the cutter to be attached directly to a canopy loop, and to receive the end portion of the suspension line which is attached to the canopy loop on which the reefing line cutter is mounted so that the canopy loop and suspension line will operate normally and yet the reefing line cutter can be attached thereto and held positively when the latch finger is closed. The latch is held in place by the threaded nut of an electrical conductor utilized for carrying the signal to the explosive charge in the cutter. Thus, the operation of attaching the cutter is simplified to the extent that it is merely placed in the canopy loop, with the suspension line in its provided receptacle, the latch is closed, and the electrical connector is threaded into place. The latch is then held closed and it is also insured that the connector will be positively fastened at the same time.

It is an object of the present invention to present a reefing line cutter utilizing a unique way of attaching it to the canopy of a parachute used for delivering loads.

In the drawings,

FIG. 1 is a schematic view of a partially reefed parachute used for dropping loads to ground troops and having a reefing line cutter made according to the present invention installed thereon;

FIG. 2 is a fragmentary enlarged side view of a reefing line cutter made according to the present invention and taken as on line 2—2 in FIG. 1;

FIG. 3 is a sectional view taken as on line 3—3 in FIG. 2;

FIG. 4 is a side elevational view of the device of FIG. 3 before it has been installed on the canopy of the parachute; and FIG. 5 is an end elevational view of the device of FIG. 4 as viewed from the left end in FIG. 4.

Referring to the drawings and the numerals of reference thereon, a parachute illustrated generally at 10 includes a canopy member 11 to which a plurality of canopy loops 12 are attached. The canopy loops are located adjacent the outer peripheral end 13 of the parachute and a plurality of suspension lines 14 are attached to these canopy loops. The suspension lines 14 are attached, one to each loop, and extend downwardly to a common point 15. At the point 15 the lines 14 are attached to an extraction line 16 which in turn leads to a load in an aircraft (not shown). The load is extracted from the aircraft and then dropped down to the ground under control of the parachute.

FIG. 1 shows the parachute released from the aircraft and trailing the same. The parachute has not fully mushroomed into its completely open position and is held in its partially closed or (as shown in solid lines) reefed position, by a reefing line 17 that is passed through each of the canopy loops 12 and is of suitable length so that the diameter of the chute at its peripheral edge 13 does not exceed a predetermined amount until the reefing line is cut. Basically, the reefing line resembles a drawstring on a bag which keeps the mouth of the bag at a predetermined diameter or size opening. If the drawstring is cut the bag can open; similarly, if the reefing line 17 is cut, the chute will open to its full diameter.

When the aircraft with its load has approached a predetermined point adjacent the target area, the reefing line is then cut so that the parachute will open to its full open position as shown in dotted lines at 20, at which time the drag on the extraction line 16 is sufficient to break away the load in the aircraft and remove the load from the aircraft. By timing the cutting of the reefing line the trajectory of the load will be known and a precise drop can be achieved.

The reefing line 17 is cut, in usual applications, with an explosively impelled cutter mounted in the housing and ignited or triggered through the use of an electrical impulse controlled back in the aircraft. A typical cutter and a unique way of fastening the cutter to the canopy, is shown in FIGS. 2–5.

As shown, the cutter assembly 21 comprises an outer housing 22 which has a cutter section 23 that is substantially cylindrical, and an attachment section 24 positioned above and attached to the cutter section. The attachment section 24 includes a main clip 25 that is integral with the housing 22 and extends upwardly therefrom. The clip 25 is L shaped, as shown, and an L shaped latch finger 26 is pivotally mounted at 27 to the upper short leg of the clip 25. The pivot 27 is spaced from the main body 22 of the housing and the short leg of the lug or clip 25 together with a first leg 28 of the latch finger 26 cooperate to form a receptacle or opening 30 above the housing 22. The axis of the opening or receptacle 30 is transverse to the longitudinal axis of the cutter. The first leg 28 of the latch finger 26 serves as a cover for the receptacle 30.

A second leg 31 of the latch finger 26 extends at right angles to leg 28 and is positioned beyond the outer end of the housing 22. The second leg 31 is bifurcated, as shown and extends parallel to the main leg of the clip 25.

In addition, the housing 22 has a pair of spaced, upstanding, substantially parallel walls 33 that together form a channel 34 that is covered at the top by the leg 28 of the latch finger 26 and has an axis which is at right angles to the axis of the opening 30. Together, the opening 30 and the channel 34 form a T shaped configuration.

The main housing 22 is substantially cylindrical in shape, as shown, and has an interior chamber 35 defined therein. The interior chamber 35 slidably houses a guillotine cutter 36 which is normally mounted adjacent to an explosive "squib" firing unit 37. The firing unit 37 is in turn threaded into the outer end of the chamber 35 and the squib or firing unit contains a suitable charge of an explosive or solid propellent that is actuated through the use of an electrical signal. The outer end portions 40 of the firing unit 37 which extends outwardly beyond the housing 22 is threaded, as shown, and forms the female portion of electrical cable connector assembly. The connector assembly is illustrated generally at 41 and is attached to a power cord 42 that leads back into the aircraft wherein the signal is controlled.

The connector 41 has a nut 43 that fits over the threaded end 40 of the firing unit 37. When the nut 43 is in place, it will insure that the electrical connection pins shown in FIG. 5 at 44 are connected in the proper receptacles of the connector 41. The nut also has a flange 45 which extends outwardly from the periphery of the nut a slight distance. When the latch finger 26 is in place as shown in FIGS. 3 and 4, and the nut is threaded onto the end portion 40 of the firing unit, the flange 45 will engage the bifurcated legs 31 and hold the legs and the latch finger down so that the latch finger 26 cannot move about its pivot point 27. When the nut 43 is loosened or the connector 41 is removed, the latch finger can pivot about its pivot point 27 to position as shown in dotted lines at 46 in FIG. 4. It will actually pivot farther upwardly than that shown on FIG. 4.

A cross hole 47 is provided through the housing 22 and it communicates with the inner end of the chamber 35. The cross hole holds and aligns the reefing line for cutting.

When the reefing line cutter is installed on a parachute, the connector 41 is removed, and the latch finger 26 is pivoted upwardly, as shown, so that the receptacle 30 is open and the channel 34 is also open at the top. The latch finger is then threaded through one of the canopy loops 12 (the correct one for location of the cord 42 is chosen) and the suspension line which is attached to the canopy loop is laid in the channel 34 while the canopy loop and the eyelet end of the suspension line are placed in the receptacle or opening 30. With the latch finger 26 raised, this is easily accomplished, as the latch finger is merely threaded through the canopy loop. The canopy loop will lay in a transverse direction with respect to the body or housing 22 and the suspension line will lay in a direction along the longitudinal axis of the body.

The reefing line 17 which is utilized, is passed through the cross hole 47 of the cutter assembly and passes completely through this cross hole. The latch finger 26 is then moved to its closed position so that it covers the receptacle 30, and also closes over the top of the channel 34 in which the suspension line is resting. An integral block that fits between the walls 33 aligns the latch finger. The connector 41 is then assembled and nut 43 is then threaded down onto the end 40 until the flange 45 rests against the bifurcated leg 31 of the latch finger 26 and thus holds the same in a closed position.

Thus, it can be seen the cutter assembly 21 cannot come loose from the canopy loop to which it has been attached and, further, it will not become entangled to the suspension line because the suspension line is held with respect to the cutter assembly as well. The cord 42 is coiled around the suspension line, in a normal application, and once the connector is in place on the firing unit, the device is ready to use, both from the standpoint of the electrical connection being complete and from the standpoint that the latch finger 26 is positively held in place so that it will not become dislodged from the canopy loop and suspension line 14. The reefing line 17 is tied at some point remote from the cutter assembly so that the reefed diameter of the chute will be held at its desired amount. Then, when the chute is to be fully released, the cutter assembly is actuated and the firing unit 37 will propel the guillotine cutter 36 in the direction indicated by arrow 50 in FIG. 3. Hence, the cutter severs the reefing line 17. The reefing line 17 will then fall out of the canopy loops and the canopy will expand to its full working diameter. When this occurs, the increased drag on the parachute is sufficient to remove the load from the plane.

It can be seen that the hinged latch finger held in place by the flange 45 of the nut on the connector greatly facilitates the installation of the cutters onto the canopy loops and suspension lines. This design also removes the possibility of fouling the cutter in the suspension lines and loops so that it is always insured that the chute will properly open. Furthermore, the reefing line will also be held properly through the cross hole 47 so that it will be severed cleanly, rapidly and without fail.

The connectors used can be of any suitable threadable connectors, for example, Bendix connectors, model SA–407–1, has been found to be satisfactory to connect onto the firing unit 37 and also for holding the latch fingers 26 in its closed position.

The squibs or firing units 37 are commercially available at the present time and are merely threaded into place in the housing after the cutter has been properly positioned.

What is claimed is:

1. A cutter assembly for a line used to reef a parachute, said parachute having a canopy and plurality of loops attached to the canopy and through which the reefing line extends, said cutter assembly having mean to receive said reefing line and hold it in position for cutting, remotely controllable means for cutting the reefing line, and a latch on the cutter assembly having a section which is openable to permit to receive one of said loops and closable to retain the cutter assembly on said one loop.

2. The combination as specified in claim 1 wherein said section comprises a pivoted latch finger which pivots to an open position to permit the finger to be passed through a loop on said canopy and movable to a closed position wherein said cutter is held to said loop.

3. The combination as specified in claim 2 wherein said means for cutting the reefing line comprises an explosively actuated device having an explosive element threadably mounted to said cutter, said latch means having means which fit over portions of said element, said element being effective to hold the latch means in closed position when the element is in place on the cutter.

4. The device of claim 1 and a suspension line attached to said one loop to which the cutter assembly is attached, a receptacle defined in said cutter assembly, said receptacle having a portion that is generally oriented to receive a part of said one loop and a second portion oriented substantially at right angles to the first portion and of size to receive a portion of said suspension line, said latch retaining said one loop and the suspension line in the respective receptacle portions when the latch is closed.

5. A cutter for a reefing line of a parachute having a canopy, a plurality of canopy loops at the periphery of the canopy and a suspension line attached to each canopy loop, said cutter having means for receiving the reefing line and means actuable to sever the reefing line when a signal is received by said cutter, said cutter having a receptacle provided thereon to receive and hold one of the canopy loops and the suspension line in that loop, a latch finger pivotally mounted to the cutter and adapted to pass through said canopy loop and cover said receptacle in closed position, and means to hold said latch finger in said closed position.

6. The combination as specified in claim 5 wherein the receptacle has two section in a T, one section of the receptacle holding the canopy loop and the other section holding the suspension line.

7. The combination as specified in claim 5 wherein the cutter is actuated by an electrical signal, and wherein an electrical connector is threadably attached to said cutter, said latch finger being held in place by said electrical connector.

8. A cutter assembly for a reefing line of a parachute having a canopy, a plurality of canopy loops at the periphery of the canopy and a suspension line attached to each canopy loop, said cutter assembly having a housing, means on said housing for receiving the reefing line, a cutter blade slidably mounted within said housing, said blade being actuable to sever the reefing line when a signal is received by said cutter assembly, a T shaped receptacle provided adjacent said housing, said receptacle having a first section for receiving and holding one of the canopy loops and a second section for receiving and holding the suspension line in that loop, a latch finger pivotally mounted at one end of said housing and being adapted to pass through said canopy loop, said latch finger being movable from an open position for facilitating placement of the canopy loop and suspension line in said receptacle to a closed position for securely holding the canopy loop and suspension line within said receptacle, and means to hold said latch finger in its closed position.

9. The combination as specified in claim 8 wherein said cutter assembly is actuated by an electrical signal and wherein an electrical connector is threadably attached to one end of said housing and is adapted to hold said latch finger in closed position.

10. The combination as specified in claim 8 wherein said reefing line receptacle means comprises a single transverse hole located at one end of said housing.

References Cited
UNITED STATES PATENTS
3,049,322  8/1962  Vlasic _____ 244—152

MILTON BUCHLER, *Primary Examiner.*

R. A. DORNON, *Assistant Examiner.*